(12) United States Patent
Li

(10) Patent No.: US 12,182,806 B2
(45) Date of Patent: Dec. 31, 2024

(54) ELECTRONIC CASH-BASED OFFLINE TRANSACTION METHOD AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 412 days.

(21) Appl. No.: 17/577,070

(22) Filed: Jan. 17, 2022

(65) Prior Publication Data

US 2022/0138744 A1 May 5, 2022

Related U.S. Application Data

(63) Continuation of application No. PCT/CN2020/098414, filed on Jun. 28, 2020.

(30) Foreign Application Priority Data

Jul. 17, 2019 (CN) .......................... 201910645420.8

(51) Int. Cl.
G06Q 20/38 (2012.01)
G06Q 20/06 (2012.01)
G06Q 20/40 (2012.01)

(52) U.S. Cl.
CPC ..... *G06Q 20/3829* (2013.01); *G06Q 20/0655* (2013.01); *G06Q 20/389* (2013.01); *G06Q 20/4014* (2013.01); *G06Q 20/407* (2013.01)

(58) Field of Classification Search
CPC .......... G06Q 20/3829; G06Q 20/0655; G06Q 20/389; G06Q 20/4014; G06Q 20/407

(Continued)

(56) References Cited

U.S. PATENT DOCUMENTS

2010/0051690 A1  3/2010 Ling
2015/0073953 A1*  3/2015 Springer .............. G06Q 20/353
                                                        705/30

(Continued)

FOREIGN PATENT DOCUMENTS

CN  103198401 A  7/2013
CN  103218714 A  7/2013

(Continued)

OTHER PUBLICATIONS

International Search Report from corresponding PCT Appln. No. PCT/CN2020/098414, dated Sep. 28, 2020.

(Continued)

*Primary Examiner* — Courtney P Jones
(74) *Attorney, Agent, or Firm* — Grossman, Tucker, Perreault & Pfleger, PLLC

(57) ABSTRACT

Provided is an electronic cash-based offline transaction method and system. The method includes: receiving, by a back-end server from a smart card, an anti-replay factor generated by the smart card; determining, by the back-end server in accordance with a predetermined algorithm, whether an abnormal transaction occurs on the smart card, generating, by the back-end server when no abnormal transaction occurs, a security information signature by signing security information with a private key of the back-end server, and transmitting, by the back-end server, the security information and the security information signature to the smart card (S2).

8 Claims, 2 Drawing Sheets

(58) Field of Classification Search
USPC .......................................................... 705/64
See application file for complete search history.

(56) References Cited

U.S. PATENT DOCUMENTS

| | | | |
|---|---|---|---|
| 2016/0300224 A1 | 10/2016 | Liu et al. | |
| 2017/0161723 A1* | 6/2017 | Hill | G06Q 20/4016 |
| 2019/0362334 A1* | 11/2019 | Wang | G06Q 20/327 |
| 2021/0004786 A1* | 1/2021 | Mossler | H04L 9/3073 |
| 2021/0004806 A1* | 1/2021 | Noe | G06Q 20/3278 |

FOREIGN PATENT DOCUMENTS

| | | | | |
|---|---|---|---|---|
| CN | 105205659 A | 12/2015 | | |
| CN | 105427106 | 3/2016 | | |
| CN | 107122822 | 9/2017 | | |
| CN | 107730253 | 2/2018 | | |
| CN | 108053205 | 5/2018 | | |
| KR | 101481407 B1 * | 1/2015 | ......... | G06Q 20/4012 |
| WO | 2015148850 A1 | 10/2015 | | |

OTHER PUBLICATIONS

Supplementary European Search Report and European Search Opinion from corresponding European Application No. 20841163.7, dated Aug. 31, 2022.
First Office Action Issued by CNIPA from corresponding Chinese Application No. CN201910645420.8, dated Jul. 29, 2023. Machine Generated English Translation Attached.

* cited by examiner

ELECTRONIC CASH-BASED OFFLINE TRANSACTION METHOD AND SYSTEM

CROSS-REFERENCES TO RELATED APPLICATIONS

The present application is a continuation of International Application No. PCT/CN2020/098414, filed on Jun. 28, 2020, which claims a priority to the Chinese Patent Application No. 201910645420.8, titled "ELECTRONIC CASH-BASED OFFLINE TRANSACTION METHOD AND SYSTEM", and filed by Tendyron Corporation on Jul. 17, 2019, the entire contents of which are incorporated herein by reference.

FIELD

The present disclosure relates to the field of electronic transaction technologies, and in particular, to an electronic cash-based offline transaction method and system.

BACKGROUND

In traditional offline transaction applications for, e.g., electronic cash, since offline transactions cannot be authenticated on the Internet in real time, a back-end server cannot settle the electronic cash in time. In a case of an offline transaction, a payment terminal stores electronic cash that can be repeatedly consumed by a user, and deducts a corresponding consumption amount from the balance in a card after each consumption by the user. Therefore, the following security problem may occur. Criminals (payers) may tamper with the balance in the card, and consume when an actual balance is insufficient. Since the transaction is performed offline, it cannot be settled in real time, and thus a payee and the back-end server cannot verify in time whether the offline transaction is valid.

Therefore, there is an urgent need for a better technical solution for the offline transactions of the electronic cash. Adding active field information to a smart card can avoid the above security problem that may occur in the offline transactions of the electronic cash.

SUMMARY

In an aspect of the present disclosure, an electronic cash-based offline transaction method is provided. The method includes: receiving, by a back-end server from a smart card, an anti-replay factor generated by the smart card; determining, by the back-end server in accordance with a predetermined algorithm, whether an abnormal transaction occurs for the smart card, generating, by the back-end server when no abnormal transaction occurs, a security information signature by signing security information with a private key of the back-end server, and transmitting, by the back-end server, the security information and the security information signature to the smart card, wherein the security information at least includes an anti-replay factor and active field information, and the active field information at least includes a term of validity of the smart card or an upper limit of a transaction amount; receiving, by the smart card, the security information and the security information signature from the back-end server, performing a signature verification, by the smart card, on the security information signature by using a public key of the back-end server, determining, by the smart card after the signature verification succeeds, whether the anti-replay factor in the security information is consistent with the anti-replay factor generated by the smart card, and storing, by the smart card, the active field information, when the anti-replay factor in the security information is consistent with the anti-replay factor generated by the smart card; establishing, by a transaction terminal, a connection with the smart card, and transmitting, by the transaction terminal, application selection information of an electronic cash transaction to the smart card, when no connection is established between the transaction terminal and the back-end server; receiving, by the smart card, the application selection information of the electronic cash transaction, determining, by the smart card, that an application for the electronic cash transaction is activated, and transmitting, by the smart card, the active field information to the transaction terminal, when no connection is established between the smart card and the back-end server; generating, by the transaction terminal, transaction information, and determining, by the transaction terminal, whether the active field information is in a valid state; terminating a transaction process, when the active field information is invalid; transmitting the transaction information to the smart card, when the active field information is valid, wherein the transaction information at least includes the transaction amount; deducting, by the smart card after receiving the transaction information, the transaction amount in the transaction information from a balance in the smart card, obtaining, by the smart card, a transaction receipt by calculating the transaction information, and transmitting, by the smart card, the transaction receipt to the transaction terminal; and establishing, by the smart card, the connection with the back-end server, generating, by the smart card, the anti-replay factor, and transmitting, by the smart card, the anti-replay factor to the back-end server.

In another aspect of the present disclosure, an electronic cash-based offline transaction system is provided. The system includes: a back-end server; a smart card; and a transaction terminal, wherein the back-end server is configured to receive from a smart card an anti-replay factor generated by the smart card, determine whether an abnormal transaction occurs on the smart card in accordance with a predetermined algorithm, generate a security information signature by signing security information with a private key of the back-end server, when no abnormal transaction occurs, and transmit the security information and the security information signature to the smart card, wherein the security information at least includes an anti-replay factor and active field information, and the active field information at least includes a term of validity of the smart card or an upper limit of a transaction amount; the smart card is configured to receive the security information and the security information signature from the back-end server, perform a signature verification on the security information signature by using a public key of the back-end server, determine, after the signature verification succeeds, whether the anti-replay factor in the security information is consistent with the anti-replay factor generated by the smart card, and store the active field information, when the anti-replay factor in the security information is consistent with the anti-replay factor generated by the smart card; the transaction terminal is configured to establish a connection with the smart card, and transmit application selection information of an electronic cash transaction to the smart card, when no connection is established between the transaction terminal and the back-end server; the smart card is further configured to receive the application selection information of the electronic cash transaction, determine that an application for the electronic cash transaction is activated, and transmit the active field information to the transaction terminal, when no connection is established between the smart card and the back-end server; the transaction terminal is further configured to generate transaction information, determine whether the active field information is in a valid state, terminate a transaction process when the active field information is invalid, and transmit the transaction information to the smart card when the active field information is valid, wherein the transaction information at least includes the transaction amount; and the smart card is further configured to deduct the transaction amount in the transaction information from a balance in the smart card after receiving the transaction information, obtain a transaction receipt by calculating the transaction information, transmit the transaction receipt to the transaction terminal, establish a connection with the back-end server, generate the anti-replay factor, and transmit the anti-replay factor to the back-end server.

BRIEF DESCRIPTION OF DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative labor.

DETAILED DESCRIPTION

Technical solutions according to embodiments of the present disclosure will be described clearly and completely below in combination with accompanying drawings of the embodiments of the present disclosure. Obviously, the embodiments described below are only a part of the embodiments of the present disclosure, rather than all embodiments of the present disclosure. Based on the embodiments of the present disclosure, all other embodiments obtained by those skilled in the art without creative labor shall fall within the protection scope of the present disclosure.

Embodiment 1

Figure 1:
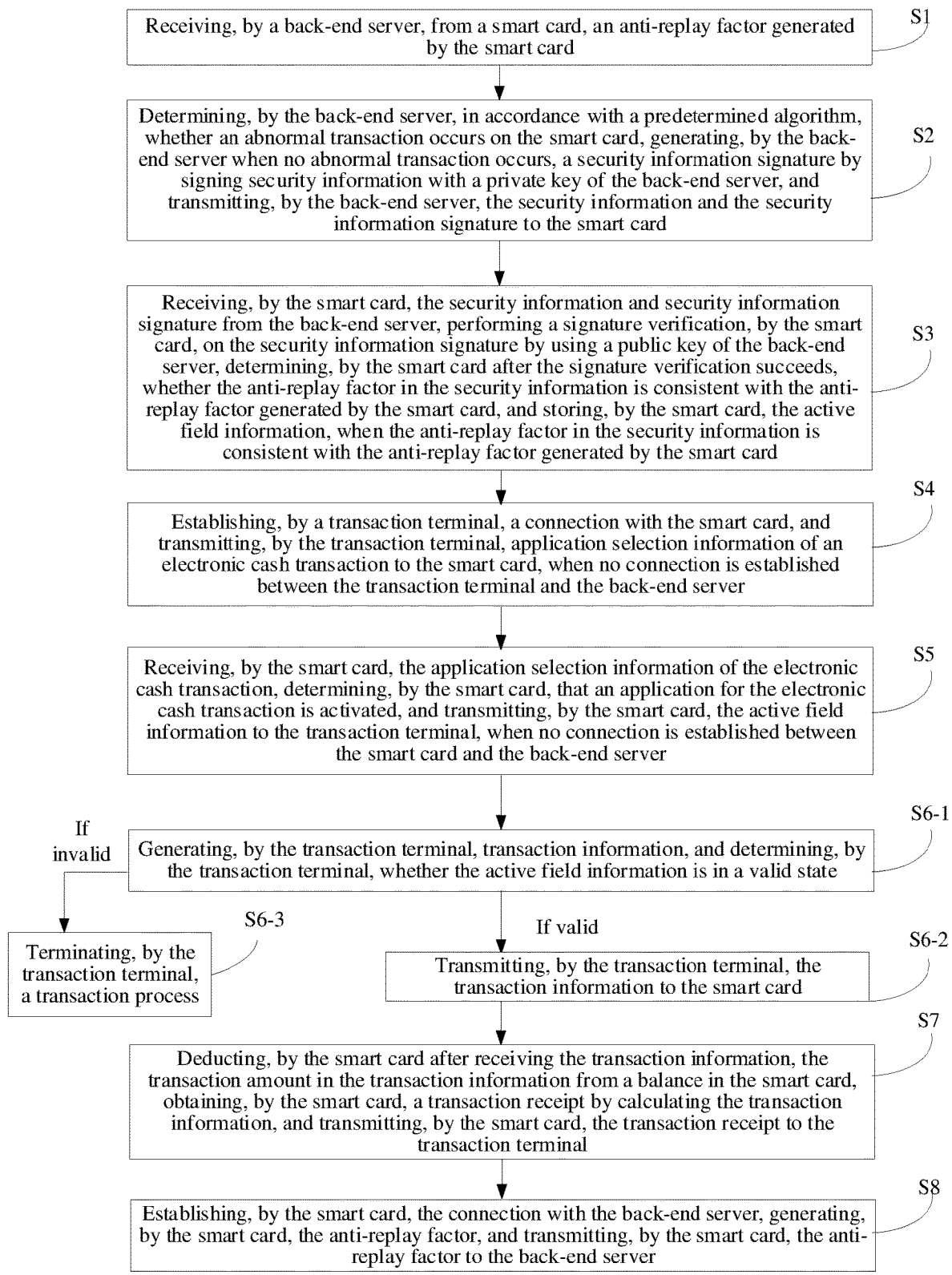
FIG. 1 is a flowchart illustrating an electronic cash-based offline transaction method according to Embodiment 1 of the present disclosure.

FIG. 1 is a flowchart illustrating an electronic cash-based offline transaction method according to the present embodiment. As illustrated in FIG. 1, the present embodiment provides an electronic cash-based offline transaction method. The method includes the following steps.

In step S1, a back-end server receives, from a smart card, an anti-replay factor generated by the smart card.

In step S2, the back-end server determines, in accordance with a predetermined algorithm, whether an abnormal transaction occurs on the smart card, generates, when no abnormal transaction occurs, a security information signature by signing security information with a private key of the back-end server, and transmits the security information and the security information signature to the smart card.

The security information at least includes an anti-replay factor and active field information, and the active field information at least includes a term of validity of the smart card or an upper limit of a transaction amount.

In step S3, the smart card receives the security information and the security information signature from the back-end server, performs a signature verification on the security information signature by using a public key of the back-end server, determines, after the signature verification succeeds, whether the anti-replay factor in the security information is consistent with the anti-replay factor generated by the smart card, and stores the active field information, when the anti-replay factor in the security information is consistent with the anti-replay factor generated by the smart card.

In step S4, a transaction terminal establishes a connection with the smart card, and transmits application selection information of an electronic cash transaction to the smart card, when no connection is established between the transaction terminal and the back-end server.

In step S5, the smart card receives the application selection information of the electronic cash transaction, determines that an application for the electronic cash transaction is activated, and transmits the active field information to the transaction terminal, when no connection is established between the smart card and the back-end server.

In step S6-1, the transaction terminal generates transaction information, and determines whether the active field information is in a valid state. When the active field information is invalid, step S6-3 is performed; and when the active field information is valid, step S6-2 is performed.

In step S6-2, the transaction terminal transmits the transaction information to the smart card.

In step S6-3, the transaction terminal terminates a transaction process.

In step S7, the smart card deducts, after receiving the transaction information, the transaction amount in the transaction information from a balance in the smart card, obtains a transaction receipt by calculating the transaction information, and transmits the transaction receipt to the transaction terminal.

In step S8, the smart card establishes the connection with the back-end server, generates the anti-replay factor, and transmits the anti-replay factor to the back-end server.

It can be seen from the above technical solution that the present embodiment provides the electronic cash-based offline transaction method. In the technical solution provided in the present embodiment, the back-end server issues the active field information to the smart card, and the smart card stores the received active field information after the verification succeeds. During a transaction, the transaction terminal obtains the active field information from the smart card and determines whether the active field information is valid. An offline transaction of electronic cash can only be completed when the active field information is valid. Therefore, the transaction terminal determines validity of an active field by determining whether the smart card is within the term of validity or whether the transaction amount is smaller than the upper limit of the transaction amount. Even when a criminal (a payer) tampers with the balance in the smart card and other information, since the active field information is issued by the back-end server, the active field information of the smart card cannot be tampered with, and thus the transaction terminal can still verify the legality of the smart card based on the active field information, which improves the security of electronic cash transactions to a certain extent.

An interaction process between the smart card and the back-end server and the transaction terminal in the method according to the present embodiment will be described in detail below.

In step S1, the back-end server receives, from the smart card, the anti-replay factor generated by the smart card.

In the present embodiment, the smart card refers to a transaction device at a payment end. It should be noted that, as an optional implementation, the transaction terminal and the smart card may be a smart card-type transaction device of the same model. That is, the smart card-type transaction device may have both a payment function and a cashier function. For convenience of description, in the present embodiment, the smart card-type transaction device is called the smart card when used as the payment end, and is called the transaction terminal when used as a cashier end. As an optional implementation, the anti-replay factor generated by the smart card may be a random number.

In step S2, the back-end server determines, in accordance with the predetermined algorithm, whether the abnormal transaction occurs on the smart card, generates, when no abnormal transaction occurs, the security information signature by signing the security information with the private key of the back-end server, and transmits the security information and the security information signature to the smart card. The security information at least includes the anti-replay factor and the active field information, and the active field information at least includes the term of validity of the smart card or the upper limit of the transaction amount.

In the present embodiment, the active field information may be the term of validity of the smart card or the upper limit of the transaction amount, or a tradable currency of the smart card, and the like. Of course, the active field information may include one or more types of the above information.

In the present embodiment, the smart card refers to the transaction device at the payment end. It should be noted that, as an optional implementation, the transaction terminal and the smart card may be the smart card-type transaction device of the same model. That is, the smart card-type transaction device may have both the payment function and the cashier function. For convenience of description, in the present embodiment, the smart card-type transaction device is referred to as the smart card when used as the payment end, and is referred to as the transaction terminal when used as the cashier end.

In the present embodiment, a specific process of determining whether the abnormal transaction occurs on the smart card by the back-end server will be described later in the present embodiment.

In step S3, the smart card receives the security information and the security information signature from the back-end server, performs the signature verification on the security information signature by using the public key of the back-end server, determines, after the signature verification succeeds, whether the anti-replay factor in the security information is consistent with the anti-replay factor generated by the smart card, and stores the active field information, when the anti-replay factor in the security information is consistent with the anti-replay factor generated by the smart card.

In the present embodiment, the smart card obtains, from the back-end server, a public key of the back-end server, and performs the signature verification on the security information signature issued by the back-end server by using the public key. Therefore, the smart card can confirm reliability of a source of the received security information by way of signature verification. In addition, when an illegal device performs a replay attack on the back-end server, the anti-replay factor in the security information issued by the back-end server is inconsistent with the anti-replay factor generated by the smart card. Therefore, the back-end server can avoid replay attacks from illegal devices by using the anti-replay factor. In addition, in the present embodiment, the active field information of the smart card is issued by the back-end server, and the smart card cannot modify the active field information, thereby ensuring the reliability of the active field information.

In step S4, the transaction terminal establishes the connection with the smart card, and transmits the application selection information of the electronic cash transaction to the smart card, when no connection is established between the transaction terminal and the back-end server.

In the present embodiment, the transaction terminal refers to a transaction device at the cashier end, which can be a mobile phone, a Point of Sales (POS) machine, or other transaction devices with an offline transaction function of electronic cash, or a smart card-type transaction device.

In step S5, the smart card receives the application selection information of the electronic cash transaction, determines that the application for the electronic cash transaction is activated, and transmits the active field information to the transaction terminal, when no connection is established between the smart card and the back-end server.

In step S6-1, the transaction terminal generates the transaction information, and determines whether the active field information is in the valid state. When the active field information is invalid, step S6-3 is performed; and when the active field information is valid, step S6-2 is performed.

In step S6-2, the transaction terminal transmits the transaction information to the smart card.

In step S6-3, the transaction terminal terminates the transaction process.

In the present embodiment, the transaction amount may be entered by a payee user into a transaction terminal to be traded, or obtained by the transaction terminal to be traded in other ways. As an optional implementation, the transaction information may also include other fields besides the transaction amount, for example transaction time, identification information of the smart card, identification information of the transaction terminal, a currency type identifier, and the like.

As an optional implementation, when the active field information includes the upper limit of the transaction amount, step S6-1 specifically includes: generating, by the transaction terminal, the transaction information, and determining, by the transaction terminal, whether the transaction amount in the transaction information is smaller than or equal to the upper limit of the transaction amount. When the transaction amount is smaller than or equal to the upper limit of the transaction amount, the active field information is valid, and step S6-2 is performed; and when the transaction amount is greater than the upper limit of the transaction amount, the active field information is invalid, and step S6-3 is performed. As a result, when the back-end server issues the active field information, the upper limit of the transaction amount of the smart card is issued to the smart card, which can restrict a transaction limit of the smart card, thereby effectively preventing criminals from making false large payments with the smart card by means of tampering with the balance and other information of the smart card.

As an optional implementation, when the active field information includes the term of validity of the smart card, step S6-1 specifically includes: generating, by the transaction terminal, the transaction information, and determining, by the transaction terminal, whether the transaction time is within the term of validity of the smart card. When the transaction time is within the term of validity of the smart card, the active field information is valid, and step S6-2 is performed; and when the transaction time is not within the term of validity of the smart card, the active field information is invalid, and step S6-3 is performed. In the present embodiment, the transaction time may be current time obtained by the transaction terminal. Therefore, when the back-end server issues the active field information, the term of validity of the smart card is issued to the smart card to restrict the use of the smart card within the term of validity, thereby avoiding security problems caused by long-term use of the smart card in an offline state.

The present embodiment only takes the active field information being the term of validity of the smart card or the upper limit of the transaction amount as an example to exemplify the method of determining the validity of the active field information. When the active field information includes different types of information, e.g., the term of validity of the smart card, the tradable currency, and the upper limit of the transaction amount, upon determining the validity of the active field information, the transaction amount needs to be lower than the upper limit of the transaction amount, the transaction time needs to be within the term of validity, and the transaction currency needs to be the tradable currency. That is, only when all the fields included in the active field information are valid the active field information of the smart card can be determined to be valid.

In step S7, the smart card deducts, after receiving the transaction information, the transaction amount in the transaction information from the balance in the smart card, obtains the transaction receipt by calculating the transaction information, and transmits the transaction receipt to the transaction terminal.

In the present embodiment, the transaction receipt may be a signature value of the transaction information obtained by the smart card signing the transaction information with a private key of the smart card, or may be a cipher text of the transaction information obtained by the smart card encrypting the transaction information with an encryption key. Therefore, in subsequent steps of electronic cash settlement, the back-end server can verify the transaction receipt, thereby verifying an identity of the payer.

As an optional implementation, prior to deducting, by the smart card, the transaction amount in the transaction information from the balance in the smart card in step 7, the smart card may also verify whether the transaction amount in the received transaction information is smaller than or equal to the balance in the smart card. When the transaction amount is smaller than or equal to the balance in the smart card, the smart card deducts the transaction amount in the transaction information from the balance in the smart card; and when the transaction amount is greater than the balance in the smart card, the smart card terminates the transaction process. Of course, in practical applications, the smart card may have a function of prompting the user with the balance in the smart card, such that the user can determine by himself/herself whether the balance in the smart card is sufficient to pay the transaction amount, and cannot use the smart card for payment when the balance in the smart card is insufficient.

In step S8, the smart card establishes the connection with the back-end server, generates the anti-replay factor, and transmits the anti-replay factor to the back-end server.

As an optional implementation, the smart card, after establishing the connection with the back-end server, generates transaction settlement information based on electronic cash stored in the smart card and all transaction receipts generated when no connection is established between the smart card and the back-end server, and transmits the transaction settlement information to the back-end server. Each transaction settlement information at least includes at least one transaction receipt; and the back-end server receives the transaction settlement information from the smart card, and performs electronic cash settlement based on the transaction settlement information.

As an optional implementation, when the at least one transaction receipt includes the signature value of the transaction information, the back-end server can use the public key of the smart card to perform the signature verification on each transaction receipt in the transaction settlement information, and perform, after the signature verification succeeds, the electronic cash settlement based on the transaction information in each transaction receipt. As another optional implementation, when the at least one transaction receipt includes the cipher text of the transaction information, the back-end server can use a decryption key to decrypt each transaction receipt to obtain a plain text of the transaction information, and perform the electronic cash settlement based on the plain text of each transaction information. The decryption key used by the back-end server and the encryption key used by the smart card may be pre-negotiated symmetric keys or asymmetric keys. Therefore, the back-end server can verify the identity of the payer by verifying the transaction receipt.

As an optional implementation, subsequent to receiving, by the back-end server, the transaction settlement information from the smart card, and performing the electronic cash settlement, by the back-end server, based on the transaction settlement information, the method further includes: issuing, by the back-end server, new electronic cash to the smart card; and receiving and storing, by the smart card, the new electronic cash, and adding, by the smart card, a denomination of the new electronic cash to the balance in the smart card.

As an optional implementation, determining, by the back-end server in accordance with the predetermined algorithm, whether the abnormal transaction occurs on the smart card includes: receiving, by the back-end server, the transaction settlement information transmitted by the smart card, and determining, by the back-end server, whether a total transaction amount of all transaction information generated when no connection is established between the smart card and the back-end server is greater than a denomination of the electronic cash stored in the smart card, and determining, by the back-end server, that the abnormal transaction occurs on the smart card, when the total transaction amount of all transaction information generated when no connection is established between the smart card and the back-end server is greater than the denomination of the electronic cash stored in the smart card.

In a specific implementation, as an example, the smart card is a smart card A. The denomination of the electronic cash stored in the smart card A is 100 yuan, the upper limit of the transaction amount of the smart card A is 50 yuan, and a term of transaction validity is Jan. 1, 2020. The smart card A can pay up to 50 yuan in electronic cash for each transaction, and the transaction time needs to be before Jan. 1, 2020. After Jan. 1, 2020, or when the user wants to pay more than 50 yuan in electronic cash, the smart card A must establish a connection with the back-end server to obtain updated active field information and perform an electronic cash settlement process, so as to continue using its offline electronic cash transaction function. The smart card A can record the balance in the smart card. After each payment, the smart card A can deduct the transaction amount of the payment to complete an update of a current balance in the smart card. For example, the smart card A has performed two electronic transactions: one is 60 yuan and the other is 40 yuan. At this time, the balance in the smart card is 0 yuan, and the smart card A needs to establish a connection with the back-end server and enter a settlement process. The transaction settlement information transmitted by the smart card A to the back-end server includes two transaction information corresponding to the above two payments and the electronic cash stored in smart card A. The back-end server calculates that a total transaction amount of the above two payments is 100 yuan based on the transaction amount of each transaction information received, and determines that the total transaction amount is not greater than the denomination 100 yuan of the electronic cash stored in the smart card. That is, it is determined that no abnormal transaction occurs on the smart card, and the electronic cash settlement can be completed. Therefore, when criminals tamper with the balance in the smart card A, it is possible that a sum of the transaction amount of a plurality of consecutive payments of the smart card A is greater than 100 yuan. In this manner, when performing the electronic cash settlement, the back-end server determines that the abnormal transaction occurs on the smart card A and thus issues no updated active field information to the smart card A. Consequently, the smart card A can no longer perform a next offline transaction, which effectively prevents the criminals from making illegal consumption.

In the present embodiment, after the electronic cash settlement, the smart card A can obtain new electronic cash from the back-end server when no abnormal transaction occurs on the smart card A. Specifically, after the transaction settlement information transmitted by the smart card A to the back-end server includes the two transaction information corresponding to the above two payments and the electronic cash (a denomination of 100 yuan) stored in the smart card A, the smart card A can delete the electronic cash stored in the smart card A, or the smart card A can set the electronic cash stored in the smart card A as unavailable. After performing the electronic cash settlement, the back-end server issues the new electronic cash (a denomination of 200 yuan) to the smart card A. The smart card A receives and stores the new electronic cash, and adds 200 yuan to a current balance in the smart card.

Embodiment 2

Figure 2:
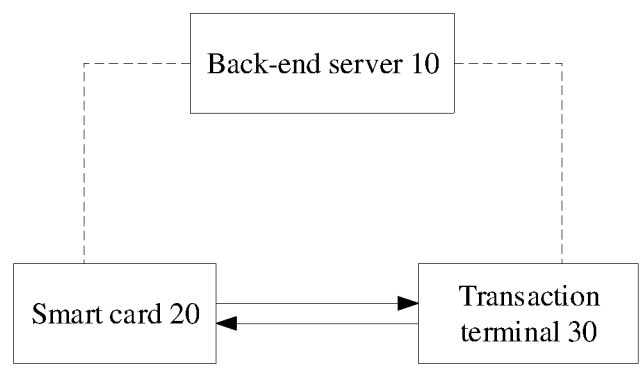
FIG. 2 is a schematic diagram of a structure of an electronic cash-based offline transaction system according to Embodiment 2 of the present disclosure.

FIG. 2 is a schematic diagram of a structure of an electronic cash-based offline transaction system according to the present embodiment. The structure of the system according to the present embodiment will be described in detail below in combination with FIG. 2.

The present embodiment provides an electronic cash-based offline transaction system. The system includes a back-end server 10, a smart card 20, and a transaction terminal 30.

In the present embodiment, the smart card 20 refers to a transaction device at the payment end. It should be noted that, as an optional implementation, the transaction terminal 30 and the smart card 20 may be the smart card-type transaction device of the same model. That is, the smart card-type transaction device may have both a payment function and a cashier function. For convenience of description, in the present embodiment, the smart card-type transaction device is referred to as the smart card 20 when used as the payment end, and is referred to as the transaction terminal 30 when used as the cashier end.

The back-end server 10 is configured to receive from a smart card 20 an anti-replay factor generated by the smart card 20, determine whether an abnormal transaction occurs on the smart card 20 in accordance with a predetermined algorithm, generate a security information signature by signing security information with a private key of the back-end server 10, when no abnormal transaction occurs, and transmit the security information and the security information signature to the smart card 20. The security information at least includes an anti-replay factor and active field information, and the active field information at least includes a term of validity of the smart card 20 or an upper limit of a transaction amount.

In the present embodiment, the active field information may be the term of validity of the smart card 20 or the upper limit of the transaction amount, or a tradable currency of the smart card 20, and the like. Of course, the active field information may include one or more types of the above information.

In the present embodiment, the smart card 20 refers to the transaction device at the payment end. It should be noted that, as an optional implementation, the transaction terminal 30 and the smart card 20 may be the smart card-type transaction device of the same model. That is, the smart card-type transaction device may have both the payment function and the cashier function. For convenience of description, in the present embodiment, the smart-card type transaction device is referred to as the smart card 20 when used as the payment end, and is referred to as the transaction terminal 30 when used as the cashier end.

The smart card 20 is configured to receive the security information and the security information signature from the back-end server 10, perform a signature verification on the security information signature by using a public key of the back-end server 10, determine, after the signature verification succeeds, whether the anti-replay factor in the security information is consistent with the anti-replay factor generated by the smart card 20, and store the active field information, when the anti-replay factor in the security information is consistent with the anti-replay factor generated by the smart card 20.

In the present embodiment, the smart card 20 obtains, from the back-end server 10, a public key of the back-end server 10, and performs the signature verification on the security information signature issued by the back-end server 10 by using the public key. Therefore, the smart card 20 can confirm reliability of a source of the received security information by way of signature verification. In addition, when an illegal device performs a replay attack on the back-end server 10, the anti-replay factor in the security information issued by the back-end server 10 is inconsistent with the anti-replay factor generated by the smart card. Therefore, the back-end server 10 can avoid replay attacks from illegal devices by using the anti-replay factor. In addition, in the present embodiment, the active field information of the smart card 20 is issued by the back-end server 10, and the smart card 20 cannot modify the active field information, thereby ensuring the reliability of the active field information.

The transaction terminal 30 is configured to establish a connection with the smart card 20, and transmit application selection information of an electronic cash transaction to the smart card 20, when no connection is established between the transaction terminal and the back-end server 10.

In the present embodiment, the transaction terminal 30 refers to a transaction device at the cashier end, which can be a mobile phone, a POS machine, or other transaction devices with an offline transaction function of electronic cash, or a smart card-type transaction device.

The smart card 20 is further configured to receive the application selection information of the electronic cash transaction, determine that an application for the electronic cash transaction is activated, and transmit the active field information to the transaction terminal 30, when no connection is established between the smart card 20 and the back-end server 10.

The transaction terminal 30 is further configured to generate transaction information, determine whether the active field information is in a valid state, terminate a transaction process when the active field information is invalid, and transmit the transaction information to the smart card 20 when the active field information is valid. The transaction information at least includes the transaction amount.

In the present embodiment, the transaction amount may be entered by a payee user into a transaction terminal 30 to be traded, or obtained by the transaction terminal 30 to be traded in other ways. As an optional implementation, the transaction information may also include other fields besides the transaction amount, for example transaction time, identification information of the smart card 20, identification information of the transaction terminal 30, a currency type identifier, and the like.

As an optional implementation, when the active field information includes the upper limit of the transaction amount, the transaction terminal 30 is further configured to generate the transaction information and determine whether the transaction amount in the transaction information is smaller than or equal to the upper limit of the transaction amount. When the transaction amount is smaller than or equal to the upper limit of the transaction amount, the active field information is determined to be valid; and when the transaction amount is greater than the upper limit of the transaction amount, the active field information is determined to be invalid. As a result, when the back-end server 10 issues the active field information, the upper limit of the transaction amount of the smart card 20 is issued to the smart card 20, which can restrict a transaction limit of the smart card 20, thereby effectively preventing criminals from making false large payments with the smart card 20 by means of tampering with the balance and other information of the smart card 20.

As an optional implementation, when the active field information includes the term of validity of the smart card 20, the transaction terminal 30 is further configured to generate the transaction information and determine whether the transaction time is within the term of validity of the smart card 20. When the transaction time is within the term of validity of the smart card 20, the active field information is determined to be valid; and when the transaction time is not within the term of validity of the smart card 20, the active field information is determined to be invalid. In the present embodiment, the transaction time may be current time obtained by the transaction terminal 30. Therefore, when the back-end server 10 issues the active field information, the term of validity of the smart card 20 is issued to the smart card 20 to restrict the use of the smart card 20 within the term of validity, thereby avoiding security problems caused by long-term use of the smart card 20 in an offline state.

The present embodiment only takes the active field information being the term of validity of the smart card 20 or the upper limit of the transaction amount as an example to exemplify the method of determining the validity of the active field information. When the active field information includes different types of information, e.g., the term of validity of the smart card 20, the tradable currency, and the upper limit of the transaction amount, upon determining the validity of the active field information, the transaction amount needs to be lower than the upper limit of the transaction amount, the transaction time needs to be within the term of validity, and the transaction currency needs to be the tradable currency. That is, only when all the fields included in the active field information are valid, the active field information of the smart card 20 can be determined to be valid.

The smart card 20 is further configured to deduct the transaction amount in the transaction information from a balance in the smart card after receiving the transaction information, obtain a transaction receipt by calculating the transaction information, transmit the transaction receipt to the transaction terminal, establish a connection with the back-end server 10, generate the anti-replay factor, and transmit the anti-replay factor to the back-end server 10.

In the present embodiment, the transaction receipt may be a signature value of the transaction information obtained by the smart card 20 signing the transaction information with a private key of the smart card 20, or may be a cipher text of the transaction information obtained by the smart card 20 encrypting the transaction information with an encryption key. Therefore, in subsequent steps of electronic cash settlement, the back-end server 10 can verify the transaction receipt, thereby verifying an identity of the payer.

As an optional implementation, the smart card 20 may also verify whether the transaction amount in the received transaction information is smaller than or equal to the balance in the smart card. When the transaction amount is smaller than or equal to the balance in the smart card, the smart card deducts the transaction amount in the transaction information from the balance in the smart card 20; and when the transaction amount is greater than the balance in the smart card 20, the smart card 20 terminates the transaction process. Of course, in practical applications, the smart card 20 may have a display screen that displays the balance in the smart card 20 to the user, such that the user can determine by himself/herself whether the balance in the smart card 20 is sufficient to pay the transaction amount, and cannot use the smart card 20 for payment when the balance in the smart card 20 is insufficient.

As an optional implementation, the smart card 20 is further configured to generate, after the smart card 20 establishes the connection with the back-end server 10, transaction settlement information based on electronic cash stored in the smart card 20 and all transaction receipts generated when no connection is established between the smart card 20 and the back-end server 10, and transmit the transaction settlement information to the back-end server 10. Each transaction settlement information at least includes at least one transaction receipt. The back-end server 10 is further configured to receive the transaction settlement information from the smart card 20, and perform electronic cash settlement based on the transaction settlement information.

As an optional implementation, when the at least one transaction receipt includes the signature value of the transaction information, the back-end server 10 can use the public key of the smart card 20 to perform the signature verification on each transaction receipt in the transaction settlement information, and perform, after the signature verification succeeds, the electronic cash settlement based on the transaction information in each transaction receipt. As another optional implementation, when the at least one transaction receipt includes the cipher text of the transaction information, the back-end server 10 can use a decryption key to decrypt each transaction receipt to obtain a plain text of the transaction information, and perform the electronic cash settlement based on the plain text of each transaction information. The decryption key used by the back-end server 10 and the encryption key used by the smart card 20 may be pre-negotiated symmetric keys or asymmetric keys. Therefore, the back-end server 10 can verify the identity of the payer by verifying the transaction receipt.

As an optional implementation, the back-end server 10 is further configured to issue new electronic cash to the smart card 20; and the smart card 20 is further configured to receive and store the new electronic cash, and add a denomination of the new electronic cash to the balance in the smart card.

As an optional implementation, the back-end server 10 being configured to determine whether the abnormal transaction occurs on the smart card 20 in accordance with the predetermined algorithm includes: the back-end server 10 being further configured to receive the transaction settlement information transmitted by the smart card 20, and determine whether a total transaction amount of all transaction information generated when no connection is established between the smart card 20 and the back-end server 10 is greater than a denomination of the electronic cash stored in the smart card 20, and determine that the abnormal transaction occurs on the smart card 20, when the total transaction amount of all transaction information generated when no connection is established between the smart card 20 and the back-end server 10 is greater than the denomination of the electronic cash stored in the smart card 20.

In a specific implementation, as an example, the smart card is a smart card A. The denomination of the electronic cash stored in the smart card A is 100 yuan, the upper limit of the transaction amount of the smart card A is 50 yuan, and a term of transaction validity is Jan. 1, 2020. The smart card A can pay up to 50 yuan in electronic cash for each transaction, and the transaction time needs to be before Jan. 1, 2020. After Jan. 1, 2020, or when the user wants to pay more than 50 yuan in electronic cash, the smart card A must establish a connection with the back-end server to obtain updated active field information and perform an electronic cash settlement process, so as to continue using its offline electronic cash transaction function. The smart card A can record the balance in the smart card. After each payment, the smart card A can deduct the transaction amount of the payment to complete an update of a current balance in the smart card. For example, the smart card A has performed two electronic transactions: one is 60 yuan and for the other is 40 yuan. At this time, the balance in the smart card is 0 yuan, and the smart card A needs to establish a connection with the back-end server and enter a settlement process. The transaction settlement information transmitted by the smart card A to the back-end server includes two transaction information corresponding to the above two payments and the electronic cash stored in smart card A. The back-end server calculates that a total transaction amount of the above two payments is 100 yuan based on the transaction amount of each transaction information received, and determines that the total transaction amount is not greater than the denomination 100 yuan of the electronic cash stored in the smart card. That is, it is determined that no abnormal transaction occurs on the smart card, and the electronic cash settlement can be completed. Therefore, when criminals tamper with the balance in the smart card A, it is possible that a sum of a transaction amount of a plurality of consecutive payments is greater than 100 yuan. In this manner, when performing the electronic cash settlement, the back-end server determines that the abnormal transaction occurs on the smart card A and thus issues no updated active field information to the smart card A. Consequently, the smart card A can no longer perform a next offline transaction, which effectively prevents the criminals from making illegal consumption.

In the present embodiment, after the electronic cash settlement, the smart card A can obtain new electronic cash from the back-end server when no abnormal transaction occurs on the smart card A. Specifically, after the transaction settlement information transmitted by the smart card A to the back-end server includes the two transaction information corresponding to the above two payments and the electronic cash (a denomination of 100 yuan) stored in the smart card A, the smart card A can delete the electronic cash stored in the smart card A, or the smart card A can set the electronic cash stored in the smart card A as unavailable. After performing the electronic cash settlement, the back-end server issues the new electronic cash (a denomination of 200 yuan) to the smart card A. The smart card A receives and stores the new electronic cash, and adds 200 yuan to a current balance in the smart card.

It can be seen from the above technical solution that the present embodiment provides the electronic cash-based offline transaction system. In the technical solution provided in the present embodiment, the back-end server 10 issues the active field information to the smart card 20, and the smart card 20 stores the received active field information after the signature verification succeeds. During a transaction, the transaction terminal obtains the active field information from the smart card 20 and determines whether the active field information is valid. An offline transaction of electronic cash can only be completed when the active field information is valid. Therefore, the transaction terminal determines validity of an active field by determining whether the smart card 20 is within the term of validity or whether the transaction amount is smaller than the upper limit of the transaction amount. Even when a criminal (a payer) tampers with the balance in the smart card 20 and other information, since the active field information is issued by the back-end server 10, the active field information of the smart card 20 cannot be tampered with, and thus the transaction terminal can still verify the legality of the smart card 20 based on the active field information, which improves the security of electronic cash transactions to a certain extent.

What is claimed is:

1. An electronic cash-based offline transaction method, comprising:
   receiving, by a back-end server from a smart card, an anti-replay factor generated by the smart card;
   determining, by the back-end server in accordance with a predetermined algorithm, whether an abnormal transaction occurs on the smart card, generating, by the back-end server when no abnormal transaction occurs, a security information signature by signing security information with a private key of the back-end server, and transmitting, by the back-end server, the security information and the security information signature to the smart card, wherein the security information at least comprises an anti-replay factor and active field information, and the active field information at least comprises a term of validity of the smart card and a tradable currency of the smart card;

receiving, by the smart card, the security information and the security information signature from the back-end server, performing a signature verification, by the smart card, on the security information signature by using a public key of the back-end server, determining, by the smart card after the signature verification succeeds, whether the anti-replay factor in the security information is consistent with the anti-replay factor generated by the smart card, and storing, by the smart card, the active field information, when the anti-replay factor in the security information is consistent with the anti-replay factor generated by the smart card;

establishing, by a transaction terminal, a connection with the smart card, and transmitting, by the transaction terminal, application selection information of an electronic cash transaction to the smart card, when no connection is established between the transaction terminal and the back-end server;

receiving, by the smart card, the application selection information of the electronic cash transaction, determining, by the smart card, that an application for the electronic cash transaction is activated, and transmitting, by the smart card, the active field information to the transaction terminal, when no connection is established between the smart card and the back-end server;

generating, by the transaction terminal, transaction information, and determining, by the transaction terminal, whether the active field information is in a valid state, wherein the transaction information at least comprises the transaction amount, transaction time and a currency type identifier, wherein the determining whether the active field information is in the valid state comprises: determining that the active field information is in the valid state in response to the transaction time in the transaction information being within the term of validity of the smart card in the active field information and transaction currency corresponding to the currency type identifier in the transaction information being the tradable currency of the smart card in the active field information;

terminating a transaction process, when the active field information is invalid;

transmitting the transaction information to the smart card, when the active field information is valid;

deducting, by the smart card after receiving the transaction information, the transaction amount in the transaction information from a balance in the smart card, obtaining, by the smart card, a transaction receipt by calculating the transaction information, and transmitting, by the smart card, the transaction receipt to the transaction terminal; and establishing, by the smart card, the connection with the back-end server, generating, by the smart card, the anti-replay factor, and transmitting, by the smart card, the anti-replay factor to the back-end server.

2. The method according to claim 1, further comprising:

generating, by the smart card after establishing the connection with the back-end server, transaction settlement information based on electronic cash stored in the smart card and all transaction receipts generated when no connection is established between the smart card and the back-end server, and transmitting, by the smart card, the transaction settlement information to the back-end server, wherein each transaction settlement information at least comprises at least one transaction receipt; and receiving, by the back-end server, the transaction settlement information from the smart card, and performing electronic cash settlement, by the back-end server, based on the transaction settlement information.

3. The method according to claim 2, further comprising, subsequent to said receiving, by the back-end server, the transaction settlement information from the smart card, and performing the electronic cash settlement, by the back-end server, based on the transaction settlement information:

issuing, by the back-end server, new electronic cash to the smart card; and receiving and storing, by the smart card, the new electronic cash, and adding, by the smart card, a denomination of the new electronic cash to the balance in the smart card.

4. The method according to claim 3, wherein said determining, by the back-end server in accordance with the predetermined algorithm, whether the abnormal transaction occurs on the smart card comprises:

receiving, by the back-end server, the transaction settlement information transmitted by the smart card, determining, by the back-end server, whether a total transaction amount of all transaction information generated when no connection is established between the smart card and the back-end server is greater than a denomination of the electronic cash stored in the smart card, and determining, by the back-end server, that the abnormal transaction occurs on the smart card, when the total transaction amount of all transaction information generated when no connection is established between the smart card and the back-end server is greater than the denomination of the electronic cash stored in the smart card.

5. An electronic cash-based offline transaction system, comprising:

a back-end server;

a smart card; and a transaction terminal, wherein the back-end server is configured to receive from a smart card an anti-replay factor generated by the smart card, determine whether an abnormal transaction occurs on the smart card in accordance with a predetermined algorithm, generate a security information signature by signing security information with a private key of the back-end server, when no abnormal transaction occurs, and transmit the security information and the security information signature to the smart card, wherein the security information at least comprises an anti-replay factor and active field information, and the active field information at least comprises a term of validity of the smart card and a tradable currency of the smart card;

the smart card is configured to receive the security information and the security information signature from the back-end server, perform a signature verification on the security information signature by using a public key of the back-end server, determine, after the signature verification succeeds, whether the anti-replay factor in the security information is consistent with the anti-replay factor generated by the smart card, and store the active field information, when the anti-replay factor in the security information is consistent with the anti-replay factor generated by the smart card;

the transaction terminal is configured to establish a connection with the smart card, and transmit application selection information of an electronic cash transaction to the smart card, when no connection is established between the transaction terminal and the back-end server;

the smart card is further configured to receive the application selection information of the electronic cash transaction, determine that an application for the electronic cash transaction is activated, and transmit the active field information to the transaction terminal, when no connection is established between the smart card and the back-end server;

the transaction terminal is further configured to generate transaction information, determine whether the active field information is in a valid state, terminate a transaction process when the active field information is invalid, and transmit the transaction information to the smart card when the active field information is valid, wherein the transaction information at least comprises the transaction amount, transaction time and a currency type identifier, wherein determining whether the active field information is in the valid state comprises: determining that the active field information is in the valid state in response to the transaction time in the transaction information being within the term of validity of the smart card in the active field information and transaction currency corresponding to the currency type identifier in the transaction information being the tradable currency of the smart card in the active field information; and the smart card is further configured to deduct the transaction amount in the transaction information from a balance in the smart card after receiving the transaction information, obtain a transaction receipt by calculating the transaction information, transmit the transaction receipt to the transaction terminal, establish a connection with the back-end server, generate the anti-replay factor, and transmit the anti-replay factor to the back-end server.

6. The system according to claim 5, wherein the smart card is further configured to generate, after the smart card establishes the connection with the back-end server, transaction settlement information based on electronic cash stored in the smart card and all transaction receipts generated when no connection is established between the smart card and the back-end server, and transmit the transaction settlement information to the back-end server, wherein each transaction settlement information at least comprises at least one transaction receipt; and the back-end server is further configured to receive the transaction settlement information from the smart card, and perform electronic cash settlement based on the transaction settlement information.

7. The system according to claim 6, wherein the back-end server is further configured to issue new electronic cash to the smart card; and the smart card is further configured to receive and store the new electronic cash, and add a denomination of the new electronic cash to the balance in the smart card.

8. The system according to claim 7, wherein the back-end server being configured to determine whether the abnormal transaction occurs on the smart card in accordance with the predetermined algorithm comprises:

the back-end server being further configured to receive the transaction settlement information transmitted by the smart card, and determine whether a total transaction amount of all transaction information generated when no connection is established between the smart card and the back-end server is greater than a denomination of the electronic cash stored in the smart card, and determine that the abnormal transaction occurs on the smart card, when the total transaction amount of all transaction information generated when no connection is established between the smart card and the back-end server is greater than the denomination of the electronic cash stored in the smart card.

* * * * *